March 23, 1965     L. DEMAS     3,174,792
WINDSHIELD

Filed Feb. 21, 1962     2 Sheets-Sheet 1

LOUIS DEMAS
INVENTOR.

BY *Carl J. Barbee*

ATTORNEY

March 23, 1965   L. DEMAS   3,174,792
WINDSHIELD
Filed Feb. 21, 1962   2 Sheets-Sheet 2
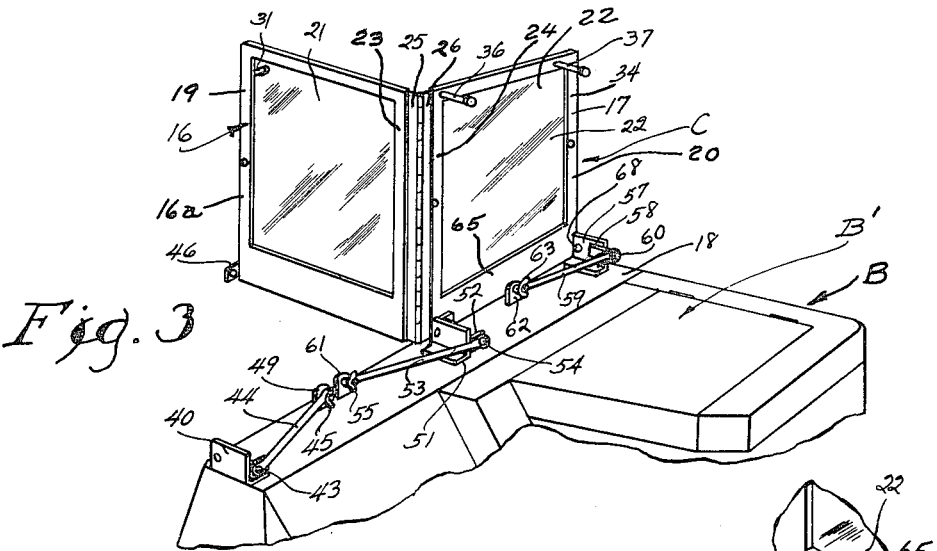
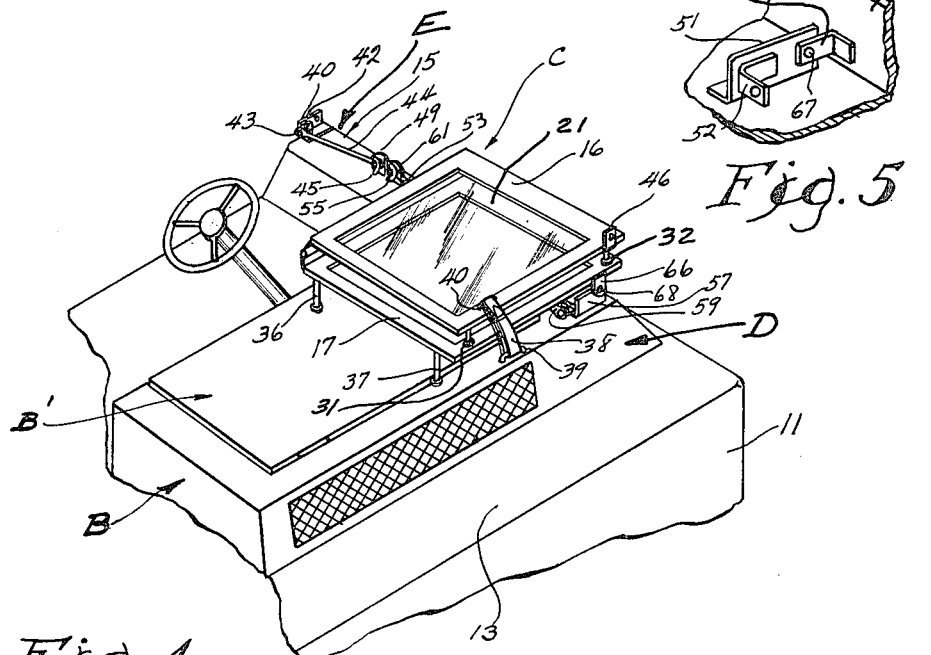
Louis Demas
INVENTOR.
BY Carl J. Barbee
ATTORNEY

United States Patent Office 3,174,792
Patented Mar. 23, 1965

3,174,792
WINDSHIELD
Louis Demas, Oak Park, Mich., assignor to American Motors Corporation, Kenosha, Wis., a corporation of Maryland
Filed Feb. 21, 1962, Ser. No. 174,751
4 Claims. (Cl. 296—87)

The invention relates to a windshield for an automotive vehicle and has particular reference to a folding type windshield for use with an automotive vehicle having a generally flat engine compartment hood for accommodating the windshield when folded down.

The principal object of the invention is to provide a folding type of windshield for such a vehicle.

A specific object is to provide, in a folding type windshield, inexpensive and simple supporting means for same.

Another object is to provide means for accommodating the windshield supporting means when not in use.

Other objects and advantages of the invention will be apparent from the ensuing specification and appended drawings in which:

FIGURE 3 is a perspective view similar to FIGURE 2 but showing the windshield partially folded.

FIGURE 4 is a perspective view of a portion of the vehicle showing the windshield in completely folded position.

FIGURE 5 is a fragmentary perspective detail view taken from the angle of FIGURE 4.

Figure 1:
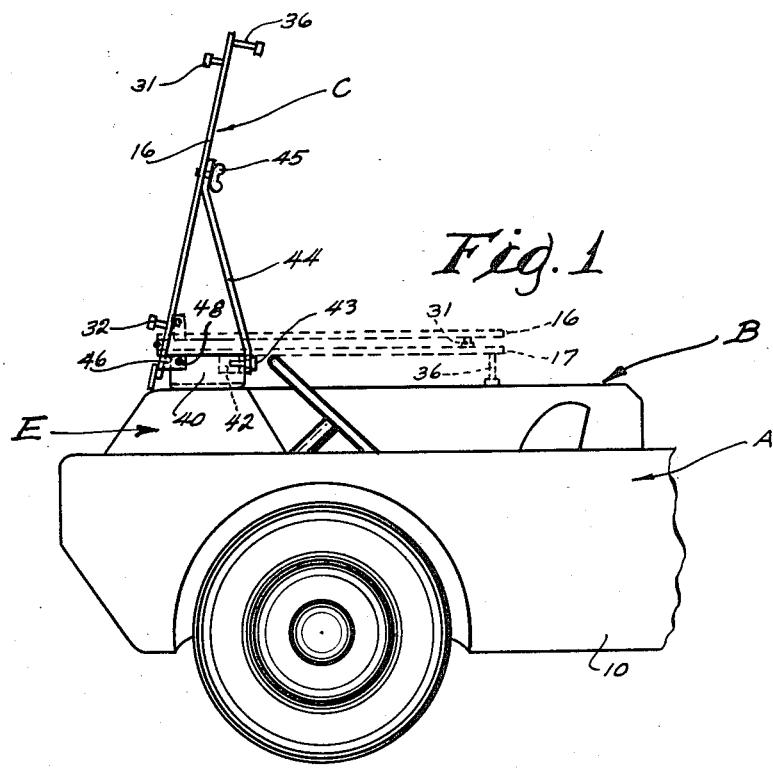
FIGURE 1 is a side elevational view of the forward portion of a vehicle with the windshield in raised position.
Figure 2:
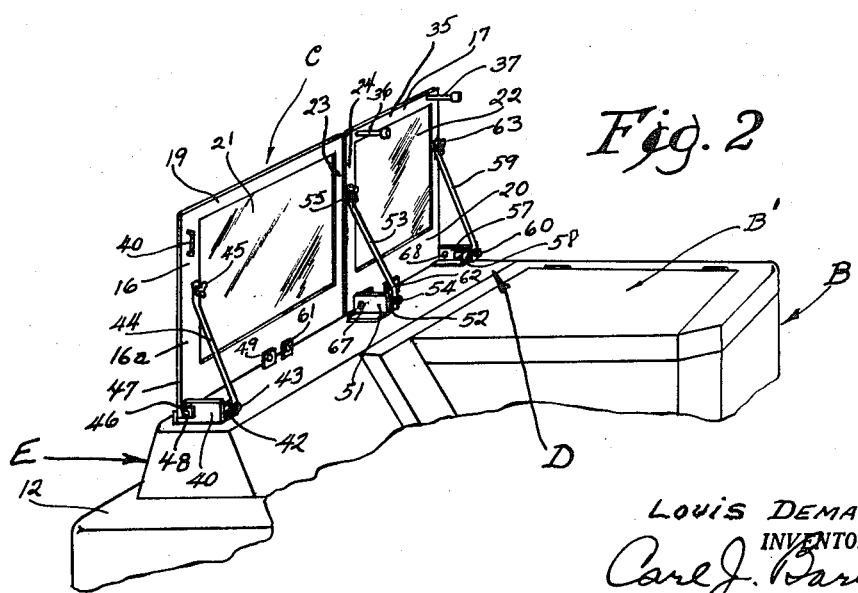
FIGURE 2 is a perspective view of a portion of the vehicle showing the windshield in raised position.

In general, the vehicle includes a body identified by the letter A having an engine compartment B covered by a flat metal hood B' for accommodating the windshield C when in folded position, as shown in FIGURE 4. At the forward end of the engine compartment is a radiator housing D. An instrument housing E adjoins the radiator housing.

The vehicle may have side walls 10 and 11 with inwardly directed fender portions 12 and 13. The engine compartment may project above the level of the fenders and its upper surface, including the hood, is generally flat. The upper surface 15 of the instrument housing serves to support the left half 16 of the windshield. The right half 17 of the windshield is supported on the upper surface 18 of the radiator housing.

Each half of the windshield is comprised of a supporting frame 19 and 20, respectively, with transparent panes 21 and 22, respectively, supported in such frames. The center side frame members 23 and 24 each have the hinge butts 25 and 26, respectively, anchored thereto. The hinge 27 may be of the piano type whereby the forward side of the left half of the windshield is folded over face to face with the forward side of the right half. Then the right half together with the left half is folded down to the position shown in FIGURE 4 in a manner to be explained hereinafter.

Mounted on the side frame member 33 of the left half of the windshield are resilient pads 31 and 32 anchored at the ends of suitable support pins for engaging the side frame member 34 of the right half of the windshield, as shown in FIGURE 4. The header 35 of the windshield frame 20 has spaced support pins 36 and 37 with resilient pads anchored at their ends for engaging the hood of the engine compartment when the right half of the windshield is folded down to the position shown in FIGURE 4. A flexible strap 38 may extend between the staples 39 and 40 for holding the windshield in folded position against the engine compartment surface.

An L-shaped bracket 40 has one flange anchored to the upper surface 15 of the instrument housing E and its other flange projecting upwardly therefrom. A second L-shaped bracket 42 has one flange anchored to the inside face of bracket 40. A bolt 43 extends through a hole in the lower end of support brace 44 and is threaded into the outwardly projecting flange of bracket 42. A thumb screw 45 extends through a hole in the upper end of the brace and is threaded into the side frame member 16a. A flat bracket 46 is welded to the side edge 47 of the frame member 16a and has an opening therein through which bolt 48 extends. The bolt 48 is removed and thumb screw 45 is loosened to permit the left half of the windshield to be swung over in the manner shown in FIGURE 3. The upper end of brace 44 is temporarily anchored to the bracket 49 by means of thumb screw 45 as shown in FIGURE 3 when the brace is not in use for supporting the windshield. The brace, of course, swings downwardly about the axis of bolt 43. An L-shaped bracket 51 has one flange anchored to the upper surface 18 of the radiator housing and its other flange projecting upwardly therefrom.

An additional L-shaped bracket 52 is anchored to the upwardly projecting flange of bracket 51 and the lower end of brace 53 is secured thereto by means of bolt 54. A thumb screw 55 removably secures the upper end of brace 53 to frame member 24. Another L-shaped bracket 57 is anchored to the radiator housing and has an L-shaped bracket 58 anchored thereto for accommodating the lower end of brace 59 by means of bolt 60. Brackets 61 and 62 accommodate the thumb screws 55 and 63 to hold the braces in the manner shown in FIGURE 3 when not in use for supporting the right half of the windshield.

Bracket 66 is similar to bracket 46 and is welded to the edge of side frame member 34 and bracket 66a is secured to the sill portion 65 of frame 20. Bolts 67 and 68 secure the brackets 66 and 66a to the brackets 51 and 57 whereby to pivotally anchor the windshield frame 20 relative to the brackets 51 and 57, thereby providing a horizontal axis about which the right half of the windshield swings when folded down as shown in FIGURE 4.

What is claimed is:

1. A windshield for a vehicle having a generally horizontal supporting surface comprising adjacent sections of frames hinged on a generally vertical axis to permit a first frame to be folded over in laminating fashion relative to a second frame; wind deflecting panes secured in the frames; said second frame having a sill portion adjacent to the supporting surface and spaced side frame members projecting upwardly from the opposite ends of the sill portion; brackets anchored to the supporting surface and spaced from each other; the sill portion of the second frame being pivotally connected to the brackets, whereby the second frame is hinged on a generally horizontal axis relative to the supporting surface of the vehicle to permit folding the first and second frame sections downwardly in laminated fashion relative to the supporting surface; braces having their lower ends pivotally connected to the spaced brackets and their upper ends removably secured to the side frame members of the second frame.

2. A windshield for a vehicle having a generally horizontal supporting surface comprising adjacent sections of frames hinged on a generally vertical axis to permit a first frame to be folded over in laminating fashion relative to a second frame; wind deflecting panes secured in the frame; said second frame including a sill portion adjacent to the supporting surface and side frame members projecting upwardly from the opposite ends of the sill portion; spaced first and second brackets secured to and projecting upwardly from the supporting surface; supporting braces pivotally secured at their lower ends to the first and second brackets for swinging movement toward the supporting surface to a substantially horizontal parking poistion, the upper ends of the braces being removably fastened to the side frame members for holding the second frame in upright position relative to the supporting surface; said second frame having its sill portion hingedly connected to the first and second brackets on a generally horizontal axis to permit folding the first and second frame sections downwardly in laminated fashion relative to the supporting surface.

3. A windshield for a vehicle as set forth in claim 2 wherein a third bracket is secured to and projects upwardly from the supporting surface and a third brace is removably fastened at its upper end to the outer end of the first frame remote from the vertical hinge and is pivotally secured at its lower end to the third bracket.

4. A windshield as set forth in claim 3 wherein the second frame is hingedly connected to the first and second brackets on generally horizontal axes which are transverse to the generally horizontal axes of the pivotal connections of the lower ends of the braces relative to first and second brackets.

References Cited by the Examiner
UNITED STATES PATENTS

| | | | |
|---|---|---|---|
| 681,134 | 8/01 | Peterson | 296—27 |
| 995,301 | 6/11 | Sprague | 296—87 |
| 1,788,436 | 1/31 | Lunt | 296—86 X |

A. HARRY LEVY, *Primary Examiner.*

LEO FRIAGLIA, *Examiner.*